Alfred J. DeMars
INVENTOR
BY
Agent

United States Patent Office 3,423,099
Patented Jan. 21, 1969

3,423,099
VEHICLE STABILIZER
Alfred J. De Mars, Portland, Oreg., assignor of one-half to Albert T. Strand, Sandy, Oreg.
Filed Aug. 23, 1966, Ser. No. 574,453
U.S. Cl. 280—6            5 Claims
Int. Cl. B62d 37/00; B60g 21/00

ABSTRACT OF THE DISCLOSURE

A pair of elongated stabilizer rods extend transversely of a vehicle and are connected pivotally at their outer ends to the vehicle body. The inner ends of the rods are connected pivotally to gear mechanism mounted on the vehicle frame such that longitudinal movement of one of the rods in one transverse direction of the vehicle causes simultaneous movement of the other rod in the opposite transverse direction.

---

This invention relates to vehicle stabilizers, and more particularly to a device for eliminating lateral shifting and tilting of a vehicle body relative to its frame and wheels.

It is the general practice in the automotive industry to interconnect the frame and spring-mounted body of a vehicle pivotally by means of a single laterally disposed stabilizer rod. It is characteristic of such vehicles that as the body oscillates vertically relative to the frame, during movement of the vehicle around corners and over uneven roads, the body is caused to pivot arcuately about the stabilizer rod as a radius. Accordingly, there is a noticeable lateral shifting movement of the body relative to the frame and wheels. Moreover, such stabilizing devices do not prevent undesirable lateral tilting of the body on its longitudinal axis.

It is the principal object of the present invention to provide a vehicle stabilizer which accommodates vertical movement of the body relative to the frame, for normal action, while simultaneously preventing lateral shifting and tilting of the body relative to the frame and wheels.

Another important object of this invention is the provision of a vehicle stabilizer of the class described which may be integrated with the vehicle permanently during manufacture, or which may be provided as an attachment for easy removable mounting on existing vehicles.

A further important object of the present invention is the provision of a vehicle stabilizer of the class described which is of simplified and rugged construction for economical manufacture and for long service life with a minimum of maintenance and repair.

The foregoing and other objects and advantages of this invention will appear from the following detailed description, taken in connection with the accompanying drawing in which.

In its basic concept the stabilizer of the present invention includes a pair of elongated rods disposed substantially parallel to each other and with one of their respective ends adjacent each other. The outer ends of the rods are secured pivotally to laterally spaced points on a vehicle body, and the adjacent inner ends of the rods are interconnected by means supported centrally on the vehicle frame and providing movement of said rodends simultaneously in opposite directions.

Figure 1:
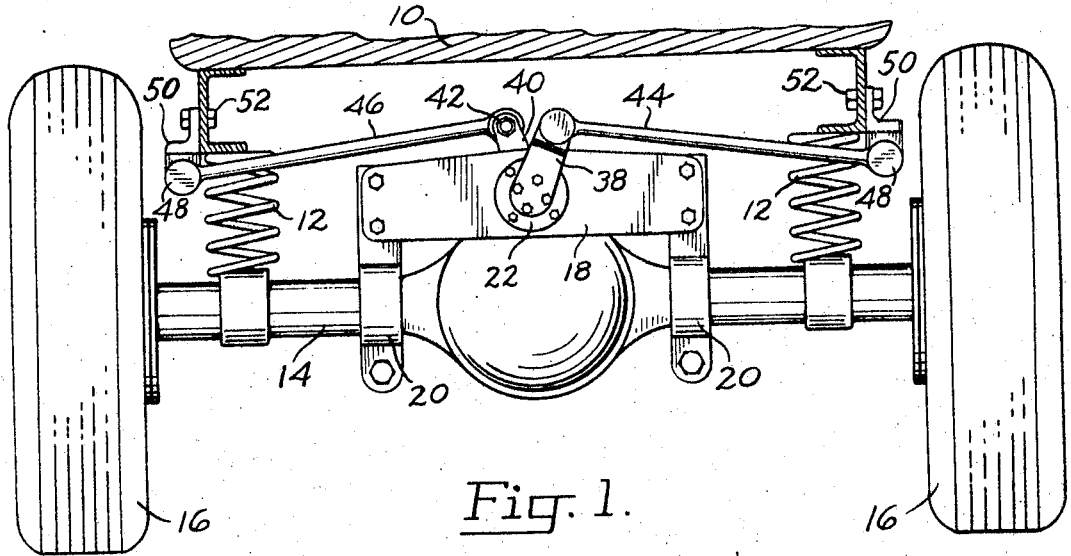
FIG. 1 is a fragmentary vertical elevation, partly in section, of the rear end of a vehicle showing mounted thereon a vehicle stabilizer embodying the features of the present invention.
Figures 2, 3:
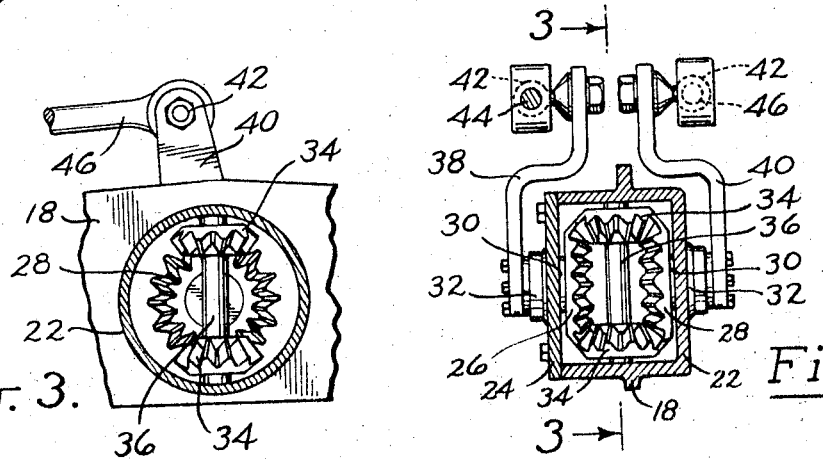
FIG. 2 is a vertical sectional view of the vehicle stabilizer of FIG. 1, taken substantially normal to the plane of FIG. 1 and viewed from the right thereof.
FIG. 3 is a fragmentary sectional view taken on the line 3—3 in FIG. 2.

Referring first to the embodiment illustrated in FIGS. 1–3, there is shown for purposes of illustration the rear view of a vehicle which includes a body 10 mounted resiliently by the springs 12 on an underlying frame 14 supported on the wheels 16.

The stabilizer includes a support member 18 which is secured in a fixed position centrally on the vehicle frame, by such means as the clamping members 20. The support member carries a hollow housing 22 which includes a removable cover plate 24 (FIG. 2). Within this housing is confined a pair of opposed, spaced gears 26 and 28. Each gear is secured to a shaft 30 which extends through the housing and is supported for rotation by a bearing 32. Both shafts are disposed on a common axis.

The opposed gears are intermeshed by means of the interposed floating pair of gears 34 which are secured to opposite ends of the connecting shaft 36. Thus, when one of the opposed gears is rotated in one direction the other gear is caused to rotate in the opposite direction.

To the outer ends of the pair of shafts 30 are secured the inner ends of a pair of lever arms 38 and 40. These arms extend radially from the axis of the shafts, and to their outer ends are pivotally secured, as by the pivots 42, the inner ends of a pair of elongated stabilizer rods 44 and 46. These rods extend substantially parallel to each other in opposite directions transversely of the vehicle body. The outer ends of the rods are secured pivotally, as by the pivots 48 to brackets 50 secured to the vehicle body 10, as by the bolts 52. The greater the lateral spacing between the brackets 50 the greater is the stabilizing efficiency of the device.

It is to be noted from FIG. 1 that the stabilizer rods 44 and 46 slope downward from their inner to their outer ends, in the normal rest position of the vehicle. The inclination of each rod preferably is such as to form with a plane parallel to the vehicle frame an included angle of approximately 15°. The purpose of this inclination is explained more fully hereinafter.

To illustrate the operation of the stabilizer described hereinbefore, let it be assumed that the vehicle is rounding a curve or is otherwise being subjected to a force which tends to move the body 10 toward the left relative to the frame 14. Such movement of the body would move stabilizer rod 46 to the left and cause the lever arm 40 and its attached gear 28 to rotate counterclockwise (FIG. 1). However, such rotation of the gear 28 would effect simultaneous clockwise rotation of the opposite gear 26 and its attached lever arm 38. Clockwise rotation of the lever arm 38 would effect movement of its attached stabilizer rod 44 toward the right. Accordingly, since both stabilizer rods thus will move in opposite directions, the vehicle body 10 is restrained from lateral movement relative to the frame 14.

Let it now be assumed that the vehicle is subjected to a force which moves the left side of the body 10 downward toward the frame 14. This motion effects counterclockwise rotation of the lever arm 40 and its attached gear 28, thereby causing simultaneous clockwise rotation of the opposed gear 26 and its attached lever arm 38. Accordingly, the downward movement of the left side of the body is not accompanied by a lateral shifting of the body 10 relative to the frame 14.

It is to be noted that when the lever arm 38 is rotated clockwise as the left side of the vehicle body moves downward, the stabilizer rod 44 connected to the arm 38 is caused to move laterally outward. Since the stabilizer rod slopes downward to the pivot 48, the outward thrust of the stabilizer rod pulls the right side of the vehicle body downward. Thus, the vehicle body is maintained substantially level with the frame, regardless of forces tending to move one side or the other of the body vertically. This stabilizing effect is evidenced by the absence of lateral tilting of the vehicle body during cornering or as the wheels roll over raises or depressions in a roadway.

However, since both rods always move simultaneously in opposite directions, the stabilizer permits complete freedom of vertical movement of the body relative to the frame. Thus, unimpaired and normal functioning of the springs 12 is afforded.

Figures 4, 5:
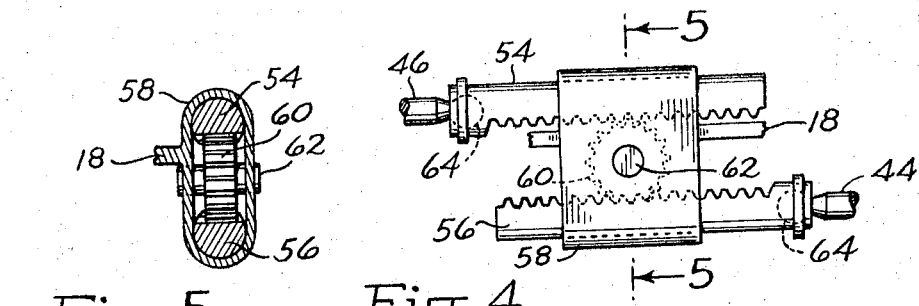
FIG. 4 is a fragmentary plan view showing a modified form of vehicle stabilizer embodying the features of the present invention.
FIG. 5 is a fragmentary sectional view taken on the line 5—5 in FIG. 4.

Referring now to the embodiment illustrated in FIGS 4 and 5, the gear and lever arm assembly described hereinbefore is replaced by a pair of opposed, spaced apart elongated racks 54 and 56 supported in an open ended housing 58 carried by the support member 18 and intermeshed by the intermediate gear 60. This gear is supported for rotation on the shaft 62 carried by the housing. The oppositely facing ends of the racks are connected one to each of the stabilizer rods 44 and 46 by such means as the universal connections 64.

It will be evident that the rack and pinion assembly operates in the same manner as the gear assembly previously described, since movement of one of the racks in one direction operates through the intermediate gear 60 to move the other rack simultaneously in the opposite direction.

From the foregoing it will be apparent that the present invention provides an economical vehicle stabilizer of simplified and rugged construction capable of long service life with minimum maintenance and repair. It functions efficiently to prevent lateral shifting and tilting of a vehicle body relative to its frame, while accommodating normal vertical movement. The stabilizer may be provided as an attachment for easy installation on existing vehicles, by such means as the clamps 20 and brackets 50 illustrated. It may also be integrated with a vehicle by permanently welding or otherwise securing the support member 18 and brackets 50 to the frame and body members of the vehicle during assembly of the latter.

Having now described my invention and the manner in which it may be used, what I claim as new and desire to secure by Letters Patent is:

1. A stabilizer for a vehicle having a body supported resiliently above a ground-supported frame, the stabilizer comprising:
   (a) a pair of elongated stabilizer members disposed substantially parallel to each other with one of their respective ends adjacent each other, the pair of stabilizer members being disposed transversely of said vehicle,
   (b) means on the outer ends of the stabilizer members securing said outer ends pivotally to laterally spaced points on said vehicle body,
   (c) connector means interengaging the adjacent inner ends of the stabilizer members for moving one of said members longitudinally in one transverse direction of the vehicle simultaneously upon movement of the other member in the opposite transverse direction, and
   (d) support means for the connector means secured to the ground-supported frame of the vehicle intermediate the lateral sides thereof.

2. The stabilizer of claim 1 wherein each of the pair of stabilizer members projects laterally outward and downward from its inner end to its outer end.

3. The stabilizer of claim 1 wherein the connector means comprises a pair of opposed gears one connected to the inner end of each stabilizer member, and gear means between and intermeshing the opposed gears.

4. The stabilizer of claim 1 wherein the connector means comprises a pair of opposed racks one connected to the inner end of each stabilizer member, and gear means between and intermeshing the opposed racks.

5. The stabilizer of claim 4 including universal connecting means interconnecting each rack and associated stabilizer member.

References Cited

UNITED STATES PATENTS

| | | | |
|---|---|---|---|
| 1,297,325 | 3/1919 | Coleman | 267—11 |
| 2,815,202 | 12/1957 | Post | 267—11 |
| 3,007,714 | 11/1961 | Olney | 267—11 |

BENJAMIN HERSH, *Primary Examiner.*

L. D. MORRIS, JR., *Assistant Examiner.*

U.S. Cl. X.R.

267—11